(12) United States Patent
Tönjes (10) Patent No.: US 11,842,239 B2
(45) Date of Patent: Dec. 12, 2023

(54) METHOD AND DEVICE FOR PROVIDING A LICENSE PLATE, PREFERABLY A MOTOR VEHICLE LICENSE PLATE, WITH A DATA CARRIER

(71) Applicants: J. H. Tönnjes GmbH, Delmenhorst (DE); Tönnjes ISI Patent Holding GmbH, Delmenhorst (DE)

(72) Inventor: Piet Tönjes, Delmenhorst (DE)

(73) Assignees: J.H. Tönnjes GmbH, Delmenhorst (DE); Tönnjes ISI Patent Holding GmbH, Delmenhorst (DE)

( * ) Notice: Subject to any disclaimer, the term of this patent is extended or adjusted under 35 U.S.C. 154(b) by 927 days.

(21) Appl. No.: 16/651,376

(22) PCT Filed: Sep. 26, 2018

(86) PCT No.: PCT/EP2018/000451
§ 371 (c)(1),
(2) Date: Mar. 27, 2020

(87) PCT Pub. No.: WO2019/063124
PCT Pub. Date: Apr. 4, 2019

(65) Prior Publication Data
US 2020/0290529 A1    Sep. 17, 2020

(30) Foreign Application Priority Data

Sep. 29, 2017   (DE) ..................... 10 2017 009 108.0
Jun. 20, 2018   (DE) ..................... 10 2018 004 849.8

(51) Int. Cl.
*G06K 19/07*     (2006.01)
*B60R 13/10*     (2006.01)
(Continued)

(52) U.S. Cl.
CPC ........ *G06K 19/0723* (2013.01); *B29C 33/126* (2013.01); *B29C 39/10* (2013.01);
(Continued)

(58) Field of Classification Search
CPC .......... B29C 2037/80; B29C 2791/001; B29C 33/126; B29C 39/10; B29C 45/14065;
(Continued)

(56) References Cited

U.S. PATENT DOCUMENTS

| | | | |
|---|---|---|---|
| 6,628,209 B1 * | 9/2003 | Rother | ................... B60R 13/10 40/200 |
| 2007/0171077 A1 * | 7/2007 | Kawarizadeh | ...... B60R 11/0264 340/572.8 |

(Continued)

FOREIGN PATENT DOCUMENTS

| | | |
|---|---|---|
| DE | 3203801 A1 | 8/1983 |
| DE | 102013109850 A1 | 12/2014 |

(Continued)

OTHER PUBLICATIONS

European Patent Office, Mitteliung (office action in a related application), dated Jul. 7, 2022.
(Continued)

*Primary Examiner* — Philip C Tucker
*Assistant Examiner* — Brian R Slawski
(74) *Attorney, Agent, or Firm* — Laurence P. Colton; SMITH TEMPEL BLAHA LLC (57) ABSTRACT

A method and device for the automatic fitting of vehicle registration plates with data carriers. A plurality of work stations interlinked by at least one conveyor are provided for this purpose. The work stations are equipped with handling devices and associated imaging devices. As a result, a respective data carrier can be automatically gripped and placed in its precise position in the opening and prefixed
(Continued)

there. The data carriers are then each cast automatically in the opening for the permanent fixation of the data carrier in the opening of the registration plate.

7 Claims, 7 Drawing Sheets

(51) Int. Cl.
*B29C 39/10* (2006.01)
*B29C 33/12* (2006.01)
*B29C 65/78* (2006.01)
*B29C 65/48* (2006.01)
*B29C 65/72* (2006.01)
*B29C 65/00* (2006.01)
*G06V 20/62* (2022.01)
*B29L 31/30* (2006.01)

(52) U.S. Cl.
CPC .............. *B29C 65/48* (2013.01); *B29C 65/72* (2013.01); *B29C 65/7802* (2013.01); *B29C 65/7847* (2013.01); *B29C 65/7855* (2013.01); *B29C 66/90* (2013.01); *B60R 13/105* (2013.01); *B29C 2791/001* (2013.01); *B29K 2995/0003* (2013.01); *B29L 2031/3061* (2013.01); *G06V 20/625* (2022.01)

(58) Field of Classification Search
CPC ..... B29C 65/48; B29C 65/72; B29C 65/7802; B29C 65/7847; B29C 65/7844; B29C 66/90; B29C 65/7841; B29C 66/45; B29C 66/472; B29K 2995/0003; B29L 2031/3061; B44B 5/00; B60R 13/10; B60R 13/105; G06K 17/00; G06K 19/0723; G06K 19/077; G06V 20/625

USPC ..... 156/60, 64, 250, 252, 256, 272.2, 273.3, 156/293, 297, 298, 303.1, 305; 40/200

See application file for complete search history.

(56) References Cited

U.S. PATENT DOCUMENTS

| | | | |
|---|---|---|---|
| 2008/0042848 A1 | 2/2008 | Roberts | |
| 2009/0265966 A1* | 10/2009 | Persson | B60R 11/02 40/208 |
| 2011/0027520 A1* | 2/2011 | Lauterbach | E04F 15/185 428/221 |
| 2011/0262305 A1* | 10/2011 | Visinoni | B01L 3/545 156/60 |
| 2012/0029688 A1* | 2/2012 | Lager | G05B 19/41865 901/7 |
| 2015/0278671 A1* | 10/2015 | Martin | G06K 19/027 29/601 |
| 2016/0083124 A1* | 3/2016 | Last | B65G 47/905 29/430 |

FOREIGN PATENT DOCUMENTS

| | | | |
|---|---|---|---|
| JP | 2002211333 A | * | 7/2002 |
| WO | 9919170 A1 | | 4/1999 |
| WO | 2016050054 A1 | | 4/2016 |

OTHER PUBLICATIONS

New Zealand Intellectual Property Office, Patent Examination Report 2 (in a related application), dated May 13, 2022.
WIPO, International Search Report (on parent application), dated Dec. 21, 2018.

* cited by examiner

METHOD AND DEVICE FOR PROVIDING A LICENSE PLATE, PREFERABLY A MOTOR VEHICLE LICENSE PLATE, WITH A DATA CARRIER

CROSS-REFERENCE TO RELATED APPLICATIONS

This application is the US National Phase of and claims the benefit of and priority on International Application No. PCT/EP2018/000451 having a filing date of 26 Sep. 2018, which claims priority on and the benefit of German Patent Application No. 10 2017 009 108.0 having a filing date of 29 Sep. 2017 and German Patent Application No. 10 2018 004 849.8 having a filing date of 20 Jun. 2018.

BACKGROUND OF THE INVENTION

Technical Field

The invention relates to a method for providing a registration plate, preferably a motor vehicle license plate, with at least one data carrier that can be read contactlessly, wherein the data carrier is fixed in a receptacle, provided for this purpose, of a plate body or of a material web for the formation of plate bodies, or wherein the or the respective data carrier is positioned in a receptacle, provided for this purpose, of a plate body or of a material web for the formation of plate bodies of the registration plate. Further, the invention relates to a device for providing a registration plate, preferably a motor vehicle license plate, with at least one data carrier that can be read contactlessly, with at least one work station and with at least one plate body having at least one receptacle for a data carrier or with a material web for the formation of plate bodies of the registration plate.

Prior Art

Registration plates, primarily and specifically motor vehicle license plates, are increasingly provided with data carriers that can be read contactlessly, and preferably also written contactlessly.

The data carriers must be positioned precisely on or in a receptacle provided for this purpose in the plate body of the registration plate or in successive receptacles in a material web from which the plate body is punched in order for the data carriers to operate smoothly and in particular that they can be read. The ever-increasing need for registration plates provided with data carriers necessitates an automation of the process of applying the data carriers to the plate body or to material webs. No corresponding methods or devices are hitherto known.

BRIEF SUMMARY OF THE INVENTION

It thus follows that the invention is based on the object of providing precise methods and devices which are fully automatic at least to the greatest possible extent, by means of which registration plates, preferably motor vehicle license plates, or blanks and/or material webs for the formation of same, can be provided with data carriers which can at least be read contactlessly.

One method for achieving this object is a method for providing a registration plate, preferably a motor vehicle license plate, with at least one data carrier which can be read contactlessly, wherein the data carrier is fixed in a receptacle, provided for this purpose, of a plate body or of a material web for the formation of plate bodies, characterized in that the data carrier is pre-fixed in the predetermined position relative to the plate body or to the material web and/or to the receptacle in the plate body or material web and is then finally fixed in this relative position. Accordingly, it is provided that the or the respective data carrier is initially pre-fixed in its intended position relative to the plate body or in a material web for the formation of the plate body, in particular in a receptacle provided for this purpose, and subsequently finally fixed in this relative position. As a result, the respective data carrier can be automatically attached exactly in or on the respective receptacle of the plate body or material web.

The final fixing of the data carrier on or in the respective receptacle is preferably executed by casting or at least recasting in the or each receptacle. This creates a permanently reliable attachment of the data carrier in the plate body or in the material web for forming registration plate bodies. A data carrier attached in such a manner to the registration plate can no longer be separated from the registration plate without destroying it. This is particularly important in the case of motor vehicle license plates.

The pre-fixing of the data carrier on or in the respective receptacle of the plate body or material web is preferably made by means of a single or a small number of adhesion sites having a small surface area. The at least one adhesion site is applied in the region of the receptacle for the data carrier. The at least one small-area adhesion site is preferably applied or inserted into the receptacle before the data carrier is pre-fixed on the receptacle. Particular preferred for this purpose is a central and/or centred region of the receptacle. The pre-fixing process stabilises the data carrier that has been placed in the receptacle prior to and until the final fixation has been completed. Here the at least one adhesion site ensures that the position of the data carrier on the receptacle or in the receptacle does not change, or does not appreciably change, until the data carrier is fixed in the receptacle and during this fixation. One advantageous possible further development of the method offers additional support for the positioning of the adhesion site at the intended receptacle for the data carrier by providing an imaging device. Instead of the imaging device, a measuring device can also be provided, in particular when a material web is to be provided with data carriers. This option also applies in the following when reference is made only to imaging devices.

The position values from the receptacle generated by the imaging device or the like preferably control the application of the at least one adhesion site. As a result, the respective adhesion site can already be applied on or in the receptacle precisely at the intended position, specifically in a preferred automatic manner by means of a handling device, for example, or simply by a dispenser device for a substance for forming the adhesion site.

In a particularly advantageous embodiment of the method, where a plate body or material web is provided on one side with a film at least in the region of the respective receptacle, and one or each receptacle for a data carrier is formed as an opening, provision is made to apply the at least one adhesion site in the region of the respective opening on the film, or to employ the self-adhesive film for attaching the respective data carrier as the adhesion site. The film thus serves practically as a carrier for the at least one adhesion site in every continuous receptacle, which is open on all sides, in the plate body or in the material web, or that the film itself forms the adhesion site. In case the receptacle is formed as a depression, the plate body or material web does not necessarily have to be provided or covered with a film.

A further method for achieving the object stated at the outset, whereas this may also be a preferred further development of the previously described method, is a method for providing a registration plate, preferably a motor vehicle license plate, with at least one data carrier which can be read contactlessly, wherein the or the respective data carrier is positioned in a receptacle, provided for this purpose, of a plate body or of a material web for the formation of plate bodies of the registration plate, characterized in that the at least one data carrier is gripped by a handling device in a targeted manner, the position of the or each of the data carriers held by the handling device is determined by a measuring or imaging device and the plate body or the material web is then fitted with at least one data carrier on the basis of the obtained position of the data carrier on the handling device. Accordingly, in each case a single or, if necessary, a plurality of data carriers are gripped in a targeted manner by a handling device, with the position of the respective data carrier held by the handling device being determined by an imaging device so that, on the basis of the thereby received data, in particular position data, of the data carrier on the handling device, the respective data carrier is inserted into the respective receptacle of the plate body or material web which is held ready at a specific position relative to the handling device. Since the imaging device has determined the position of data carrier after it has been gripped by the handling device, the exact position of the data carrier on the handling device is known from the point in time when the imaging device has acquired its data. Based on this known position, the handling device can then deposit the data carrier precisely in or on the receptacle. The position of the receptacle is known from the specific position relative to the handling device for holding ready the plate body with the receptacle or the continuous material web with successive receptacles on defined positions of same. The method makes it possible to achieve a highly precise positioning of the data carrier on or in the respective receptacle.

Provision can be made for the data carrier to be pre-fixed in the position in which it is put on or inserted in the receptacle by at least one adhesion point previously applied in or on the receptacle. As a result, the data carrier inserted by the handling device into the receptacle is simultaneously pre-fixed in or on the receptacle. The data carrier therefore maintains the position in which it was brought to the receptacle. The data carrier cannot slip out of place in or on the receptacle during further transport, if necessary, to a subsequent work station and/or during the final step of complete fixation in or on the receptacle.

According to a further possible development of the method, provision is made that an imaging device supports, and preferably controls, the handling device in the preferably targeted gripping in each case of preferably a single data carrier, but if necessary a number of data carriers simultaneously, from a plurality of data carriers which preferably lie ready in a flat position on a level surface. As a result, the handling device can reliably travel up to the position of a particularly favourably situated data carrier in the store of allocated data carriers and securely grip the or each selected data carrier whose position has been determined. Thus, in each case the handling device, supported by the imaging device, "picks out" one or each data carrier from a store comprising a plurality of data carriers.

One further possible development of the method provides for verifying the or each data carrier held by the handling device after a data carrier has been gripped by the handling device. This ensures that no receptacle is occupied by an inoperative data carrier.

One further development of the method, which may also represent an independent solution of the object on which the invention is based, is characterized in that after the at least one data carrier has been gripped by the handling device at least individual data are read from the data carrier and preferably stored in a memory such that, after each data carrier has been gripped by the handling device, at least individual or specific data is read from the data carrier held by the handling device and filed in a memory. This allows for a logging of the data carrier associated with the respective registration plate. In this manner it is possible, for example, to create a complete production record of the registration plate. Alternatively, it is also possible to inspect the function of the respective data carrier while at least some of its data are being read.

In an advantageous development, the method can be configured or further modified such that a calculation is made before the handling device supplies data carriers to the receptacles to be provided with a data carrier in or on the plate body or on the material web, preferably by a measuring device or imaging devices. In particular, this involves a separate imaging device. As a result, the handling device can transfer the or each data carrier it holds from the known position exactly to the position or site to be assumed by the data carrier in the respective receptacle of the plate body or material web. Thus, the handling device holding the data carrier can supply the plate body or material web with the at least one data carrier on the receptacle precisely at the intended position.

A further advantageous development of the method, which can also be an independent solution of the stated object, is characterized in that the data carrier is pre-fixed in the receptacle of the plate body when it is inserted by the handling device into the receptacle of the plate body or the respective receptacle in the material web for the formation of plate bodies, preferably by being placed on at least one adhesion site on or in the respective receptacle such that the data carrier is pre-fixed in the receptacle, which is configured as a depression or opening, for example, when the data carrier is inserted in said receptacle, preferably by being placed on at least one adhesion site previously assigned to the receptacle. The data carrier is then placed or pressed on the at least one adhesion site by the handling device at the precise position relative to the receptacle. Here the data carrier forms an adhesive bond with the adhesion site, which adhesively pre-fixes the data carrier in the exact, non-displaceable position on the at least one adhesion site on or in the plate body or material web. The plate body or the material web and the at least one pre-fixed data carrier can then be subjected to further processing steps without the data carrier changing its position relative to the receptacle during or before such further processing.

Further to an advantageous further possible development of the method, the handling device inserts the data carrier in a respective receptacle, preferably configured as an opening in the plate body or material web, in such a manner that the data carrier, preferably a circumferential edge of it, is spaced from the contours of the opening. Preferably, the data carrier is inserted into the opening such that a circumferential edge of it is evenly spaced apart from the contours of the opening and/or a circumferential gap remains or is formed between the contours of the opening and the edge of the data carrier. This prevents any contact between the data carrier and the plate body or material web formed preferably from a conductive material. In other words, the data carrier is electrically isolated from the conductive plate body or the conductive material web. This is an important prerequisite for a reliable and error-free reading of the data stored on the data carrier, specifically at a relatively great distance.

In another advantageous further possible development of the method, the plate body or the material web is provided, from the rear side, with the at least one adhesion site and/or supplied with the at least one data carrier and/or the respective data carrier is cast or recast in its receptacle. Said measures are thus carried out from the rear side of the plate body or material web. From this position the opening is accessible and covered by the film on the front side of the plate body visible to the viewer after the license plate has been mounted. The plate body or the material web are therefore provided with the at least one data carrier in reverse, so to speak. If however, the receptacle is not formed by a continuous opening but rather by a depression originating at the front side of the license plate, the license plate can be provided with the respective data carrier the right way round, that is to say, with the front side facing upwards. In that case, the film, inasmuch as one is necessary or provided, must be subsequently applied to the front side of the license plate if namely the depression is to be supplied with the data carrier and recast if necessary.

A device for achieving the object stated at the outset is a device for providing a registration plate, preferably a motor vehicle license plate, with at least one data carrier which can be read contactlessly, with at least one work station and with at least one plate body having at least one receptacle for a data carrier or with a material web for the formation of plate bodies of the registration plate, characterized in that a plurality of work stations arranged in succession is provided and at least one conveyor for interlinking the work stations is provided. This device has a plurality of preferably successive work stations and one or also a plurality of conveyors for interlinking at least one, preferably all work stations. This device makes it possible to conduct preparatory steps for the insertion of a data carrier into a receptacle of the respective plate body or the material web, to supply the plate body or the material web with the respective data carrier while pre-fixing the latter during this process, and to fix the data carrier in the receptacle permanently. All of these steps can be executed with the device in successive cycles.

The relative position of the respective plate body or of the material web relative to the conveyor is reliably maintained during the further transport from one work station to the other, and in particular in the respective work station itself. As a result, the device is particularly suited for the automatic fitting of plate bodies or material webs with data carriers with the assistance of handling devices, measuring devices, positioning aids and/or imaging devices. The automatic fitting of the plate bodies or material webs can therefore be executed rapidly and precisely without any accompanying manual activities.

It is preferably provided that at least one, in particular all, work stations are associated with means, preferably imaging devices such as cameras, in order to identify the respective plate body or material web and/or to assign the respective receptacle to be fitted. As a result, the exact position of each plate body or of the material web, and in particular its receptacle, is known at those work stations where this position is required. This applies in particular to those work stations where a receptacle is fitted with a data carrier. But even at locations where the receptacle is provided with at least one adhesion site and/or the data carrier is permanently fixed by means of casting or moulding, it is important that the exact position of the plate body, material web and/or the respective receptacle on the conveyor is known in order that the handling devices or the like can be employed for the stated purposes.

In an advantageous embodiment of the device a first work station is assigned at least one dispenser device, preferably on a handling device. As an alternative or in addition, it is provided that the first work station is assigned a device, above all an imaging device, for determining the position of the plate body and/or a respective receptacle on the conveyor. In this way, at least one adhesion point can be applied in the receptacle or on the receptacle mechanically at the first work station. This can be realized in a fully automatic manner if the first work station is equipped with a handling device and/or an imaging device or some other means for determining the position of the plate body, the material web and/or the respective receptacle on the conveyor.

Instead of an imaging device at the first work station, the at least one conveyor can be assigned at least one stop at a defined position. In conjunction with at least one sensor capable of detecting the respective stop, the plate body, in particular the material web, can be held ready in a defined relative arrangement on the conveyor, on a predetermined and/or prescribed position of the first work station or in front of or to the side of the latter and/or at further work stations as necessary. The first work station then no longer needs to be assigned any imaging device for determining the position of the plate body, the material web and/or the respective receptacle to be fitted.

A second work station of the device is equipped with stocking means for store of data carriers. This stocking means is preferably realized as a pre-supply conveyor for keeping a number of data carriers ready or is provided with such. The pre-supply conveyor keeps preferably a plurality of in particular flat-lying data carriers ready for processing. Other types of stocking means such as trays or carrier straps or bands are also conceivable.

The second work station preferably has a handling device which is configured to grip in each case a single data carrier or a plurality of data carriers at the same time or in succession from a stocking means, in particular from the pre-supply conveyor. At the same time, the handling device is employed to fit the receptacles with one data carrier each. However, the invention is not restricted to the application of registration plates with only one data carrier. The invention is also suited for fitting each registration plate with a plurality of data carriers if required, preferably simultaneously, but also in succession if necessary.

The second work station is preferably equipped with a stocking means having preferably one pre-supply conveyor and at least one handling device. This increases the degree of automation of the second work station.

The second work station can be further developed by including at least one imaging device, for example at least one camera. The imaging device provides the handling device with the position of the respective data carrier to be transferred from the stocking means or from the pre-supply conveyor. As a result, the handling means can travel directly to individual data carriers in stocking means or on the pre-supply conveyor in a targeted manner and pick or grip them there. This preferably involves a data carrier among a plurality of data carriers in or on the stocking means, preferably on the pre-supply conveyor, which can be best gripped and/or which can be picked in the easiest or quickest manner.

In particular the second work station has yet a second imaging device which determines the exact position of the data carrier on the handling device after it has been gripped by the handling device, in particular representing this position and/or calculating the position data of the data carrier or providing such a calculation. This enhances the fitting of the plate body or of the material with a respective data carrier in the exact position, in particular the positioning or placing of the data carrier in its exact position on or in the at least one receptacle or in the at least one recess, configured as an opening, in the plate body or material web.

In an advantageous embodiment of the second work station, the handling device associated with it has at least one suction device for pneumatically retaining the or each gripped data carrier by means of negative pressure. The suction device holds in each case a single data carrier in a careful and reliable manner in that it exerts no mechanical forces on the data carrier which might have an adverse effect on it.

If necessary, the second work station can be assigned a third imaging device which establishes the exact position of the plate body to be fitted with the data carrier on the conveyor bearing or holding ready this plate body and in particular provides data for a precise calculation of the position of the relevant plate body and/or its receptacle for the data carrier and makes this data available to the handling device. Such a third imaging device can be dispensed with if receptacles are to be fitted with data carriers in a preferably continuous material web.

BRIEF DESCRIPTION OF THE DRAWINGS

Preferred exemplary embodiments of the invention will be discussed in more detail in the following on the basis of the drawing, in which.

DETAILED DESCRIPTION OF PREFERRED EMBODIMENTS

Figure 3:
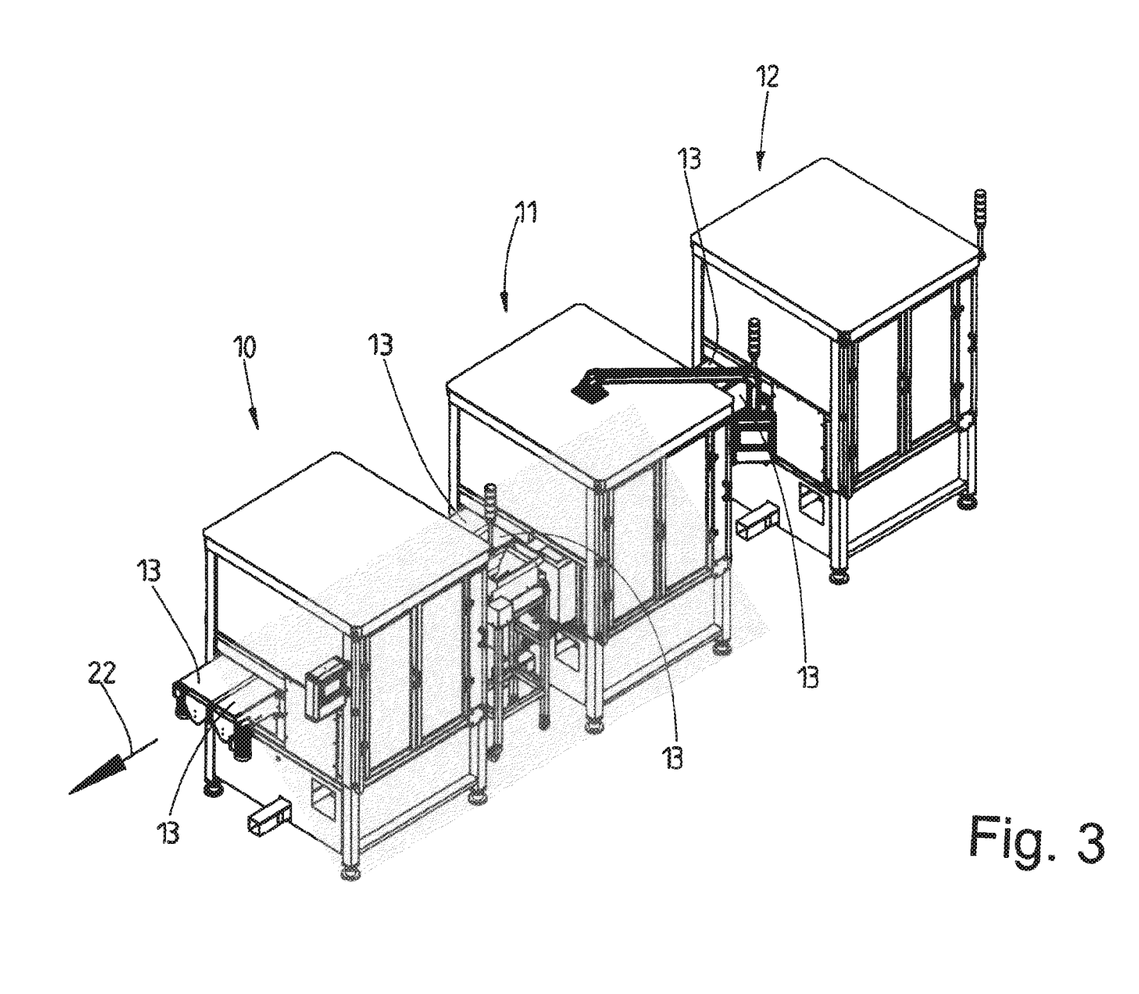
FIG. 3 shows a perspective total view of the device according to the invention.

The device shown as a whole in FIG. 3 has three work stations 10, 11 and 12, which are each assigned different individual operations. In the shown exemplary embodiment, the three work stations 10, 11 and 12 are interlinked by two parallel, preferably identical conveyors 13, which are realised as belt conveyors. However, the invention can also be realized with different conveyors, conveyors running in different courses, more than two conveyors and/or with only a single conveyor 13.

The device is employed to provide, preferably to fit, registration plates, in particular motor vehicle license plates, with data carriers 14 that can be read and/or written contactlessly. This may involve RFID chips which operate at various frequency ranges, but also NFC (Near Field Communication) chips, for example. In the present exemplary embodiment, it will be assumed that each registration plate is to be fitted with a single data carrier 14. However, the invention is also suited for fitting identification tags with a plurality of identical or even different data carriers 14.

Figure 1:
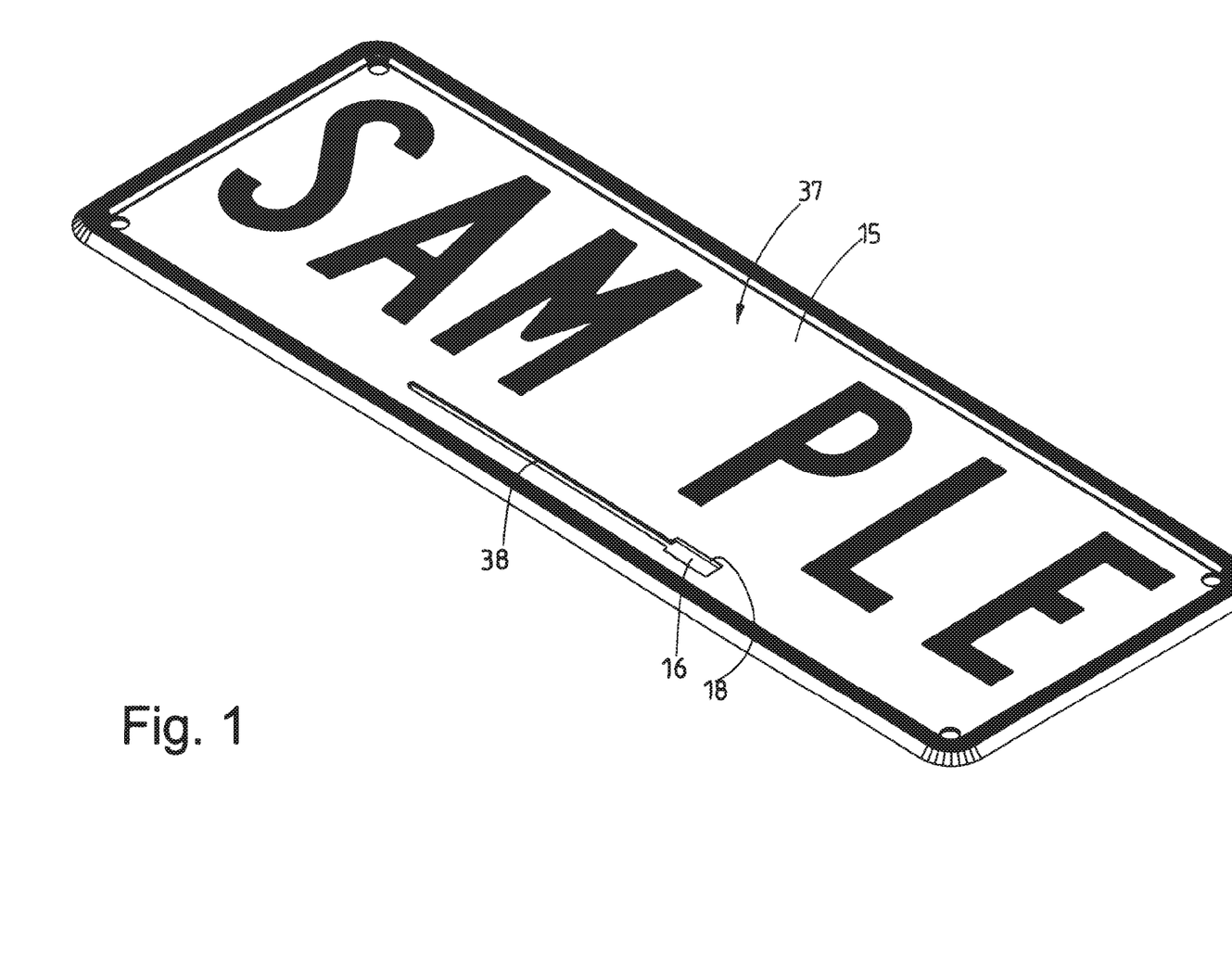
FIG. 1 shows a perspective representation of a motor vehicle license plate (not yet covered with film)
Figure 2:
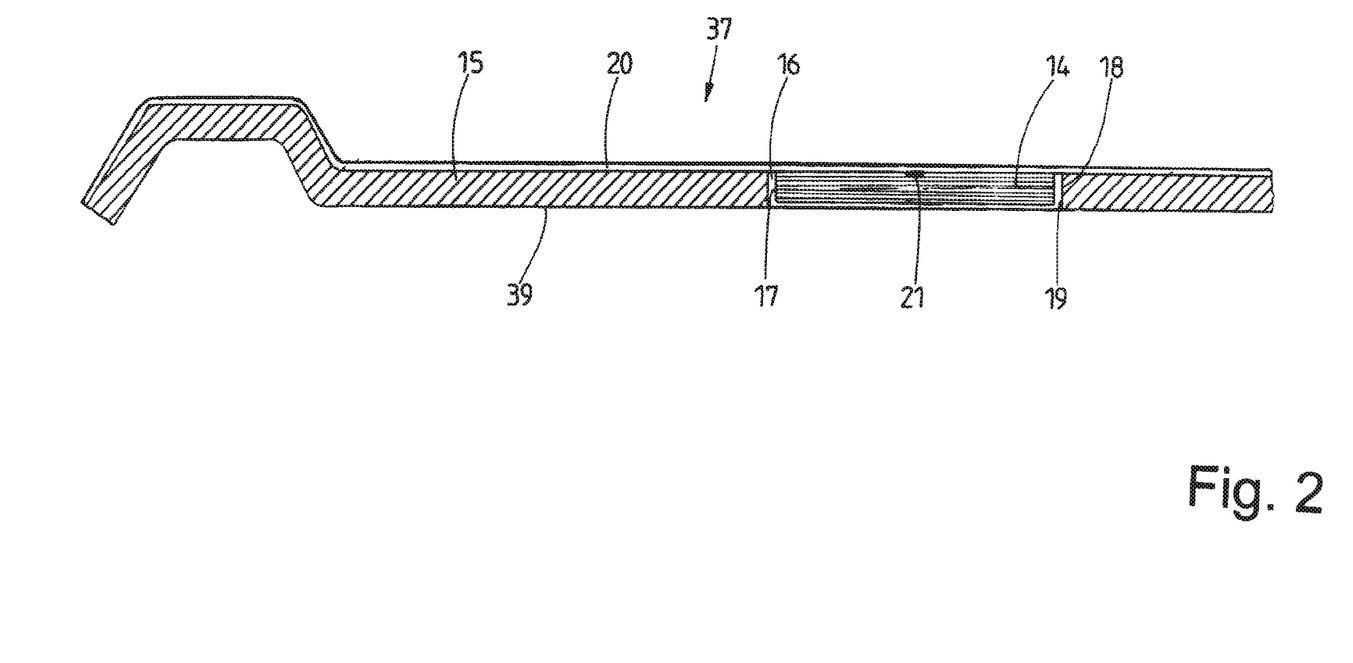
FIG. 2 shows a partial cross-section through the motor vehicle license plate in FIG. 1, on an enlarged scale.

In the case of the exemplary embodiment shown here, the data carrier 14 is provided, in particularly connected, to a plate body 15 of the license plate made of an electrically conductive material, such as aluminium or, alternatively, a synthetic material that has been made at least partially electrically conductive. For this purpose, the plate body 15 has a receptacle for the data carrier 14. In the present exemplary embodiment, the receptacle is formed as a punched-out opening 16 in the plate body 15, for example. However, the receptacle can also be a depression in the plate body 15. The opening 16 extends uninterrupted with the same cross-section from a front side 37 to the rear side 39 of the plate body 15 (FIG. 2). The opening 16 has a base area corresponding to the contour of the data carrier 14. However the opening 16 is somewhat larger that the base area of the data carrier 14, so that the outer edge 17 of the data carrier 14 is spaced all around, preferably evenly, from the contour 18 of the opening 16 after the data carrier 14 has been inserted in the opening 16. This produces a gap 19 running all the way round between the data carrier 14 and the opening 16. The ring-shaped gap 19 is preferably of uniform width at all points.

In the shown license plate the plate body 15 has an elongated slit 38. The slit 38 leads to a narrow side in the opening 16, thus forming a transition from the slit 38 to the opening 16. The slit 38 forms in particular at least one part of an antenna for the data carrier 14.

The data carrier 14 is permanently connected to the plate body 15 in the opening 16 by means of casting with a castable, non-conductive casting compound, such as a castable plastic and/or synthetic resin which preferably hardens or cures with UV radiation. Here the data carrier 14 can be completely embedded in the casting compound so that the casting compound not only fills out the circumferential gap 19 but also covers the complete surface of the front side 37 and/or rear side 39 of the data carrier 14. If necessary, one side of the data carrier 14 can remain uncovered by the casting compound or casting material.

In the shown exemplary embodiment the plate body 15, specifically the front side 37 (the side facing up in FIG. 2) of the plate body 15 visible in its assembled state, is covered or laminated with a thin film 20, for example a self-adhesive film. The film 20 extends at least across the surface area of the opening 16 and an adjacent circumferential region of same. If required, the film 20 covers the entire bottom side of the plate body 15 (FIG. 2).

Figure 4:
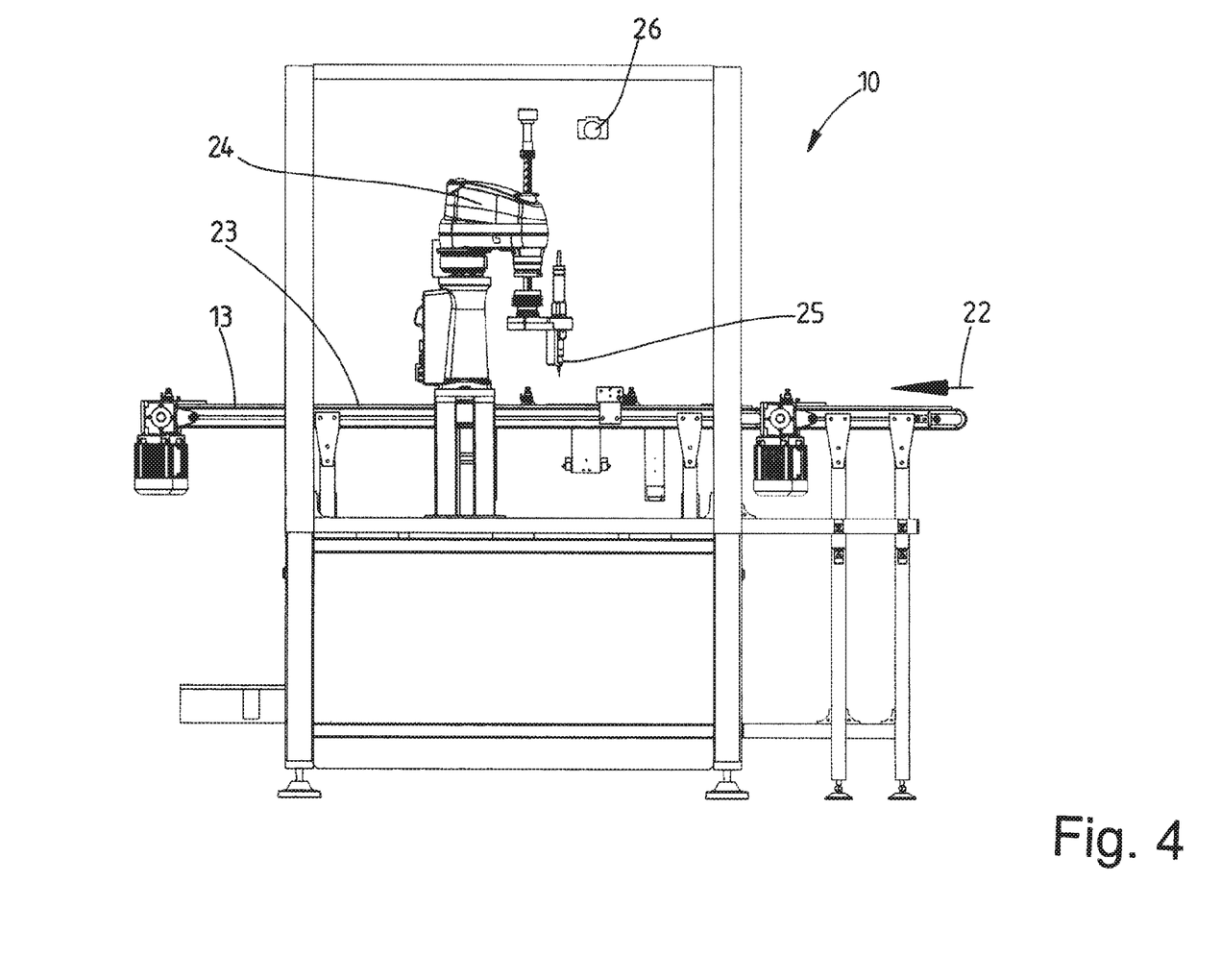
FIG. 4 shows a side view of a first work station of the device in FIG. 3.
Figure 5:
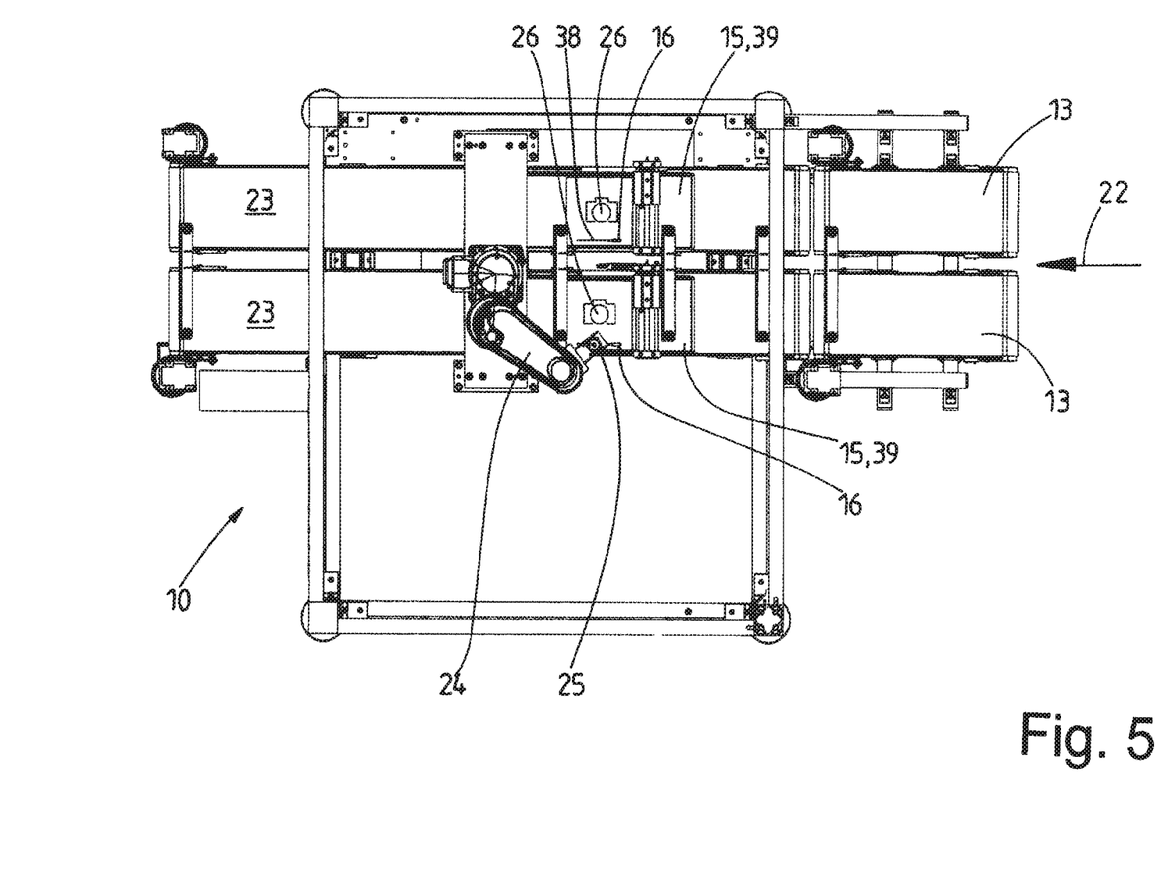
FIG. 5 shows a top view of the work station in FIG. 4.

The first work station 10 is configured for the purpose of attaching a single adhesion site 21, but also a number of adhesion sites 21 if necessary. The adhesion site 21 can be a small-area casting compound or adhesive point, for example. The adhesion site 21 is applied in the contours of the opening 16 or, alternatively, in a trough-like depression, preferably in the centre of the area. The application of the adhesion site 21 in the opening 16 or depression results in the adhesion site 21 being positioned on the film 20 freely exposed in the region of the opening 16. The adhesion site 21 is then located on the film 20 inside of the opening 16. The adhesion point 21 can be formed from a hot glue or a casting compound capable of solidifying, for example, which still exhibits adhesive characteristics after application for the purpose of pre-fixing the data carrier 14.

The first work station 10 can be dispensed with if the adhesion site 21 is formed by the adhesive layer on the bottom side of the film 20 (FIG. 2) facing the interior of the opening 16 because then no separate adhesion site 21 needs to be applied.

Following the first work station 10—inasmuch as it is not dispensable—in the direction of transport 22 of the conveyor 16 is the second work station 11. In this work station 11 the plate body 15 is fitted with the data carrier 14 by the automatic insertion of the data carrier 14 in the opening 16. In the process the bottom side of the data carrier 14 is placed on the adhesion site 21 in the opening 16 or directly on the film 20 and pressed upon it if necessary in order to pre-fix the data carrier 14 in the opening 16 of the plate body 15.

The third work station 12, which follows the second work station 11 in the direction of transport 22, serves to embed and/or recast the data carrier 14 in the opening 16 of the plate body 15, thus protectively accommodating the data carrier 14 in the opening 16 and fixing it permanently in the opening 16 to achieve a non-detachable and damage-free connection of the data carrier 14 to the plate body 15. In addition, the casting or embedding of the data carrier 14 in the opening 16 results in insulating the data carrier 14 from the electrically conductive plate body 15.

Located upstream of the first work station 10 is a magazine (not shown) with a supply of a plurality of plate bodies 15. The magazine can be realised such that it can accommodate batches of plate bodies having different formats. Individual plate bodies 15 are automatically taken from the magazine one after the other, for example by means of an appropriate charging device, and placed on upper strands 23 of the conveyor 13, preferably in an alternating manner. Depending on the configuration of the device, this can occur at specific positions on the upper strand 23 as established by stops and/or carriers for the plate bodies, for example, but also in an approximate position, as an alternative. However, the orientation of the plate body 15, particularly with respect to its opening 16, should preferably always be the same.

The plate bodies 15 are inversely positioned on the upper strand 23 of the conveyor 13, in other words with the rear side 39 facing upwards, in order that the openings 16 in the plate bodies, which are covered by the film 20 on the front side 37 of the plate body 15, are freely accessible from the rear side 39 of the plate body 15. By virtue of the openings 16 in the plate bodies 15 being freely accessible at the rear side, adhesion sites 21 can be introduced into the openings 16 and the openings 16 can be fitted with data carriers 14. In addition, the openings 16 open at the rear can be casted as such.

The first work station 10 is equipped with a handling device 24, which bears a dispenser device 25 at the end of its arm. The dispenser device 25 is realised such that it can release in a targeted manner a drop of a flowable casting material for the formation of the adhesion site 21. The dispenser device 25 is assigned a stocking means and, in addition, a heating device in case the glue or adhesive being used is a type of hot glue.

The first work station 10 is in addition equipped with an imaging device 26, for example a camera, which may be a two- or three-dimensional camera, which can be either a black-and-white camera or a colour camera. The imaging device 26 determines the position of the opening 16 of the plate body 15 held ready on the upper strand 23 of the respective conveyor 13 in the first work station 10. Image data recorded by the imaging device 26 are transferred to a control system of the handling device 24, where the position of the opening 16 relative to the handling device 24 and/or to the dispenser device 25 is calculated from the data. On the basis of the position thus calculated, the handling device 14 can move the dispenser device 25 into the position designated for the application of the adhesion site 21 at the opening 16 and apply the adhesion site 21 on the film 20 preferably at the centre of the opening 16.

Figure 6:
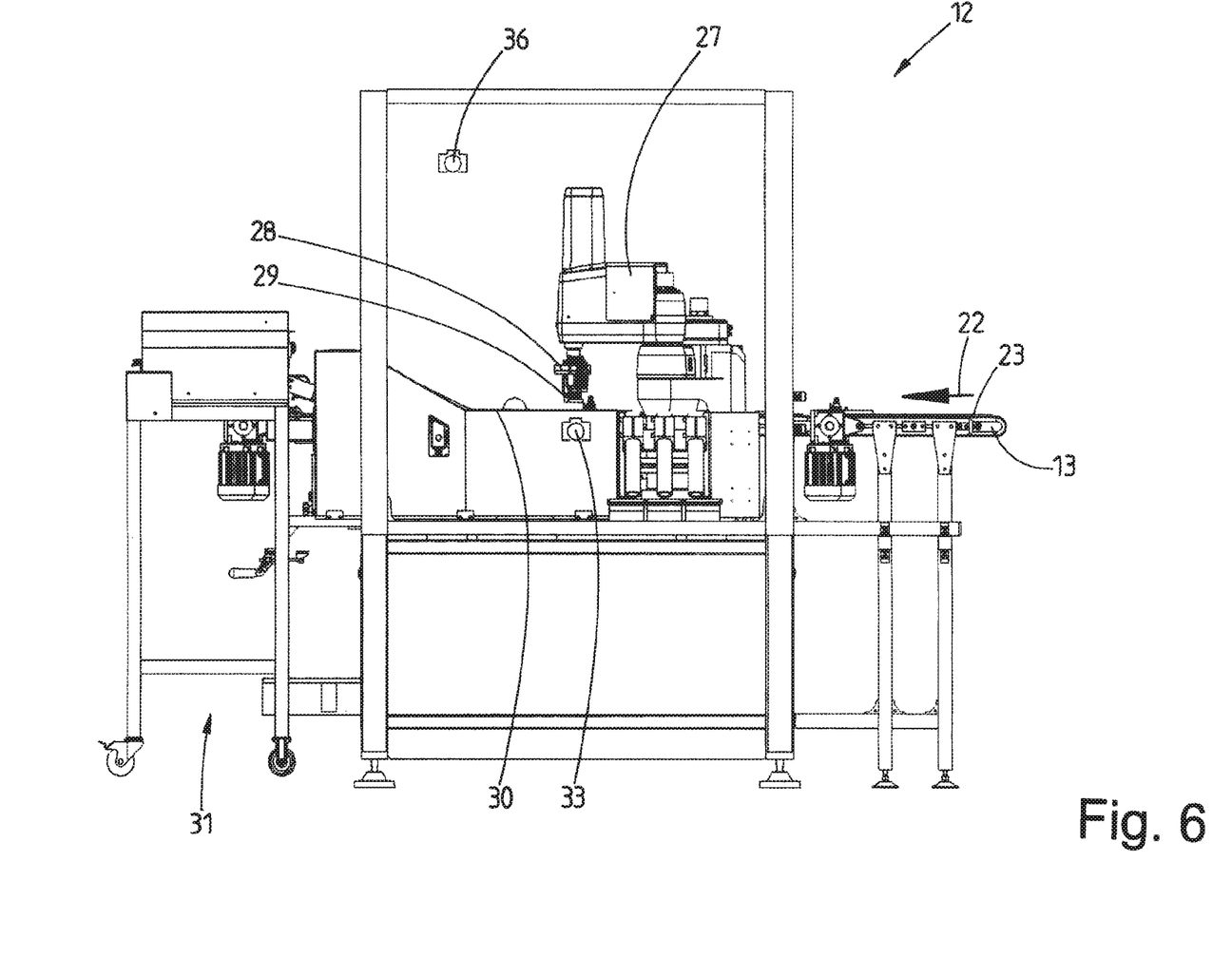
FIG. 6 shows a side view of a second work station of the device in FIG. 3.
Figure 7:
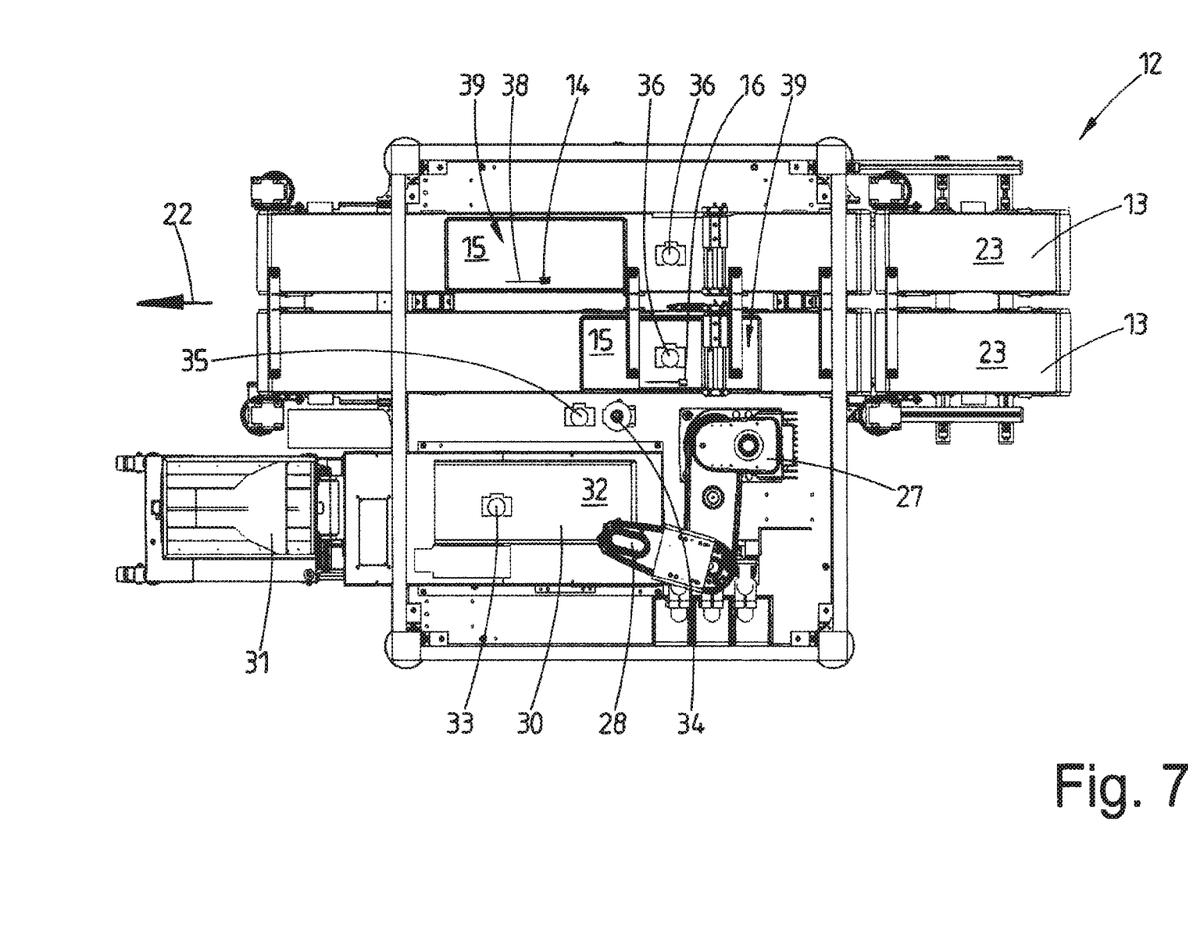
FIG. 7 shows a top view of the work station in FIG. 6.

The second work station 11 also has a central handling device 27. Located at the free end of a gripper arm 28 of the handling device 27 is at least one suction device 29 charged with negative pressure 29 and with an elastically deformable suction pad. The suction device 29 is configured and dimensioned such that it holds with negative pressure a flat side, specifically the top side, of a data carrier 14.

In the shown second work station 11, the handling device 27 is arranged somewhat between the inner conveyor of the two parallel conveyors 13 running adjacent to one another and a pre-supply conveyor 30 of a stocking device 31. The stocking device 31 contains a stock of a number of preferably identical data carriers 14. Data carriers 14 are taken one by one from this stock to an upper strand 32 of the pre-supply conveyor 30 which is realised as a belt conveyor. There is always a plurality of data carriers 14 lying on the upper strand 32 with arbitrary orientation. Here the top or bottom sides of the data carriers 14 can lie facing upwards or downwards at random. The conveyor belt of the pre-supply conveyor 30 can be driven preferably continuously at a low speed such that the upper strand 32 of the conveyor 13 continues to move along with the data carriers 14 upon it contrary to the direction of transport 22.

The second work station 11 has a first imaging device 33 in the region of pre-supply conveyor 30 above its upper strand 32. Said imaging device records an image of all data carriers 14 on the upper strand 32 or at least those located in the action area of the gripper arm 28 of the handling device 27. The imaging device 33 also records which side of the data carrier 14 lies upwards. Following the evaluation of the data transferred from the imaging device 33 to the control system of the stocking device 31, at least one suction device 29 of the handling device 27 is driven, as determined by the data of the imaging device 30, to the position of such a data carrier 14 which can be easily gripped and which is suited for fitting the plate body 15 because it lies the right way round on the upper strand 32 of the pre-supply conveyor 30, that is to say, with its top side actually facing upwards, and which is also intended to lie facing upwards after the plate body 15 has been fitted.

Data carriers 14 which lie the wrong way round on the upper strand 32 of the pre-supply conveyor 30 are not gripped and transported by the pre-supply conveyor 30 back to the start of the pre-supply conveyor 30 or stocking device 31. They continue to circulate and, if oriented correctly, return to the start of the pre-supply conveyor 30.

The drive of the pre-supply conveyor 30 can be temporarily shut down for the visual recording of the data carriers 14 and for the suction action to be applied to a selected data carrier 14 by the suction device 29 of the handling device 24. Provision is preferably made that the pre-supply conveyor 30 is driven continuously, specifically at a constant uniform speed which the control system of the handling device 27 can take into account or compensate.

The handling device 27 is preferably assigned a read station 34 near the pre-supply conveyor 30. After a data carrier 14 has been gripped by the suction device 29 of the handling device 27, this read station 34 serves to read in a contactless manner at least one item of information already stored on the data carrier 14. For example, this can be a serial number of the data carrier 14, but also, as an alternative or in addition, at least one other specification, such address data. On the basis of this information, the license plate can be identified once the plate body 15 has been fitted with the data carrier 14.

Furthermore, the second work station 11 can have a testing device which checks the data carrier 14 gripped by the handling device 27 as to whether it is in order, in particular if it can be read.

The testing station is preferably integrated into the read station 34 so that the reading of at least one item of information from the gripped data carrier 14 is simultaneously linked with its testing. For example, the non-readability of the desired information indicates a faulty function of the data carrier 14. Such a data carrier 14 is unusable and is removed as a reject by being released by the handling device 27.

Following or, if necessary, even during the readout of the desired data from the carrier 14, the data carrier 14 retained by the suction device 29 of the handling device 27 is recorded by a second imaging device 35 with respect to its exact position under the suction device 29, in other words on the handling device 27. This imaging device 35 is arranged between the pre-supply conveyor 30 and the conveyor 13 opposite thereto, specifically below the suction device 29. In this way, the data carrier 14 held by the suction device 29 of the handling device 27 passes by the imaging device 35 on its way to the conveyor 13. As it moves past the imaging device 25, or briefly pauses at the latter, the imaging device 35 measures the relative position of the data carrier 14 held by the suction device 29. As a result, it is possible to establish, for example, the position at which the data carrier 14 is held by the handling device 27 as expressed in a coordinate system running through the vertical longitudinal centre axis of the suction device 35. The data of the second imaging device 35 transferred to a control system of the handling device 27, specifically the acquired position values, provide the handling device 27 with the first reference values for the insertion of the data carrier 14 into the opening 16 of the plate body 15 in the precise position.

The second work station 11 has at least one further imaging device 36. In the shown device having two conveyors 13, each conveyor 13 is assigned its own imaging device 36. Each of the two imaging devices 36 is disposed above one of the two parallel conveyors 13. The respective imaging device 36 captures the position of the opening 16 of the plate body 15 lying turned over on the respective conveyor 13. The plate body 15 that is first brought into a position that is readily transferable for a data carrier 14 has priority in being fitted with the data carrier 14 momentarily held by the handling device 27 ("first in—first out" principle). If, for example, a plate body 15 is on an outer conveyor 13, the opening 16 is recorded by the imaging device 36 associated with said conveyor. The image data are then transferred to the control system of the handling device 27, which calculates the exact position of the opening 16 of the plate body 15. This calculated position of the opening 17 provides the handling device 27 with the second position required for the fitting operation. The data carrier 14 held by the handling device 27 is then positioned by the latter exactly over the opening 16 of the plate body 15 on the outer conveyor 13 and inserted into the opening 16. This is done by having the data carrier 14 placed, and if necessary pressed down, in the exact position provided in the opening 26 earlier at the first work station 10, namely onto the adhesion site 21 on the film 20 lying directly on the conveyor 13 under the plate body 15 lying upside down on the conveyor 13, whereby the adhesion site 21 pre-fixes the data carrier 14 in the position it has been inserted to by the handling device.

When the plate body 15 is fitted with the data carrier 14 in the second work station 11, the pre-fixing of the data carrier 14 on the plate body 15 is made in particular by the at least one adhesion site 21. In addition, the automatic fitting process is executed in such a targeted manner that results in the circumferential gap 19, preferably of equal width, being formed between the edge of the data carrier 14 and the contours 18 of the opening 16, thus ensuring that the data carrier 14 has no contact with the conductive plate body 15.

The third work station 12 following the second work station 11 serves to fix the data carrier 14 permanently in the opening 16 of the plate body 15. For this purpose, in the third work station 12, the space of the opening 16 not filled in by the plate body 15 is recast with a flowable insulating material, such as a plastic and/or synthetic resin compound which hardens or cures with UV radiation. The space in the opening 16 left empty by the data carrier 14 is thereby filled out, preferably completely. In the process, at least the circumferential gap 19 between the edge 17 of the data carrier 14 and the contours 18 of the opening 16 is filled out, thus producing an all-round bridge-like connection of the data carrier 14 with the plate body 15. At the same time, the electrically non-conductive casting material serves to form in the gap 19 an insulation barrier all around the data carrier 14 so that the latter has no electrically conductive contact with the plate body 15. In particular, the casting material also fills out the intermediate space between the film 20 and the bottom side of the data carrier 14 formed by the adhesion site 21 attached to the film 20 in the first work station 10 for the pre-fixing operation in the region of the opening 16. As a result, the entire bottom side of the data carrier 14 is also wetted and covered with casting material. When the data carrier 14 is cast in the opening 16, even the top side of the data carrier 14 can be completely covered by the casting compound over its entire surface. The data carrier 14, enclosed on all sides by the casting compound, is thereby fixed in the opening. Furthermore, the data carrier 14 is completely embedded in the electrically non-conductive casting compound. This also causes the casting compound to be flush with the rear side 39 of the plate body 15.

The casting of the data carrier 14 in the third work station 12 is carried out by a handling device assigned to the latter. To this end, the handling device, exactly like the handling device 24 of the first work station 10, is equipped with a dispenser device, which can be supplied with a stored quantity of a flowable and/or castable compound or some other electrically non-conductive substance.

The third work station 12 also has an imaging device. This imaging device records image data used to calculate the position of the plate body 15 on the respective conveyor 13 and/or of the opening 16 and/or of the data carrier 15 inserted therein. The handling device then moves the dispenser device arranged on it for a flowable casting compound, or a casting compound made flowable by heating, to the position above the data carrier 14 in the opening 16 of the plate body 15 as determined by the imaging device, where a precisely metered quantity of casting compound for casting or recasting the data carrier 14 in the opening 16 is delivered by the dispenser device. The casting compound then flows into the cavity between the opening 16 and the data carrier 14 and fills it out completely before it hardens and/or cures, e.g. under the influence of light.

Finally, the cast plate body 15 fitted with the data carrier 14 is removed by the relevant conveyor 13 to a stacking and/or packaging device for plate bodies 15 provided with data carriers 14. If necessary, the conveyors 13 can be lengthened downstream of the third work station 12 to form a finishing line. This allows the casting compound to harden sufficiently and cool off if necessary, thus ensuring that the final fixation of the data carrier 14 in the opening 16 of the plate body 15 can no longer become detached.

In place of all or only some of the imaging devices 26, 33, 35 and 36 it is possible to employ measuring devices with a different configuration and which do not necessarily involve cameras.

The invention is also not restricted to three interlinked work stations. The number of work stations may be greater or less. For example, the first work station can be omitted if the film 20 is self-adhesive on the side facing the opening 16 because then the application of at least one adhesion site 21 on the film 20 in the region of the opening 16 is no longer necessary. It is also conceivable, for example, to consolidate the second work station 11 and the third work station 12 and/or to interconnect a plurality of work stations.

It is also possible to vary the number of conveyors 13. It is possible to have more than two conveyors 13 or even just a single convenor 13. Likewise, the conveyors 13 do not necessarily have to be realised as belt conveyors. They may also be pocket conveyors, operable roller conveyors or the like.

A second exemplary embodiment of the invention not shown in the drawings provides for fitting a continuous and/or band-shaped material web made of the material of the plate body, in particular aluminium or another such electrically conductive material, with data carriers and permanently connect them with the material webs. Following in succession in the longitudinal direction of the material web, preferably in tight formation, the plate bodies are chained by the material web to each form a license plate. The material web have a width which corresponds to the width of the license plate or which is somewhat wider. The material web can be unwound endlessly and/or continuously from a supply reel.

The material web has recesses, either openings or depressions, at specifically defined positions for one data carrier each. For this purpose, the material web has preferably a single receptacle, if necessary a plurality of receptacles, for each plate body or license plate to be punched from it.

After the receptacles of the material web have been provided with data carriers one by one and attached thereto, blanks, in particular plates, for the plate body of each license plate are punched from the material web in succession. At the same time, or subsequently, the plate body can be provided with a circumferential embossed edge. Later, the intended characters, in particular letters and/or digits as well as other marks as necessary, are embossed into the plate bodies that have been fitted with at least one data carrier.

In the following it will be assumed that registration plates, preferably motor vehicle license plates, each having only a single data carrier, are to be produced from the material web, without this restricting the scope of the invention.

The material web having a receptacle for the data carrier of each license plate is moved along three individual and successive work stations, preferably three work stations pursuant to the exemplary embodiment described previously, specifically in a non-continuous manner with brief standstill periods at the individual work stations. For this purpose, the individual work stations can be interlinked with a common conveyor as in the previously described exemplary embodiment. But it is also conceivable to provide merely one support running past all work stations, for example a roller track with non-driven rollers. The material web is then further transported by it being pulled along on the base, support or roller track. Here a supply of the material web is preferably drawn off a roll or the like at the same time.

Like the pre-fixing conducted at the first work station and the final fixation, in particular the casting of the receptacles, namely the space left open in the region of the receptacles at the third work station, the fitting of the receptacles of the material web with data carriers at the second work station is in principle executed in the device of this exemplary embodiment exactly as explained in the case of the previously described exemplary embodiment, with references being made to the preceding description of the device and method of the first exemplary embodiment shown in the figures.

In a departure from the previously described exemplary embodiment of the invention, the openings for the data carrier are applied in the material web or material strips at precisely the positions indicated for the subsequent punching out of the license plate or plate body. As it passes the individual work stations the material web or the material strip is guided, for example by means of stops, laterally or in other words transversely to the continuation or transport direction. As a result, the openings are precisely aligned at the individual work stations transversely to the longitudinal direction of the strip-like material web. Due to the exactly positioned openings in the longitudinal direction of the material web, the further transport of same from one work station to the other can be stopped at every work station at the exact position. This can be achieved by measuring devices, for example light barriers as well as signal receivers for driving the further movement of the strip-shaped material web. As a result, the openings in the web or in the material strips of preferably all work stations are held ready in an exact position. For applying the data carriers to the openings, the handling devices can then be brought in a targeted manner to the exactly determined positions of the data carriers in the material web.

Provision is preferably made for spacing the individual work stations in succession from one another so that when the further transport of the material web is stopped in a position determined by a measuring device, for example, the activities assigned to all work stations, specifically at least the application and simultaneous pre-fixing of the respective data carrier in or on the receptacle as well as the final fixation of the data carrier by means of casting or recasting, can be carried out.

When the data carriers are applied in or on the receptacles of the continuous material web, it is not absolutely necessarily for imaging devices located at least at some working stations to record the position of the receptacle where the receptacles are to be provided with data carriers and/or the data carriers are to be cast in the receptacles. Since the receptacles have been provided in the material web at precisely predetermined positions, The measuring devices described previously are also sufficient for positioning the material web at the work stations, preferably at all work stations simultaneously, in order to position the data carriers on or in the receptacles correctly and precisely and for the final and permanent fixation of the data carriers in or on the receptacles with casting compound. In this case, it is not absolutely necessary to provide handling devices at least in the first and/or third work station.

In case the bottom side of the material web is already coated with a self-adhesive film and the receptacle is realised as a continuous opening in the material web, it is possible to dispense with, if appropriate, the application of at least one adhesion site at the first work station as described previously with respect to the first exemplary embodiment. Then the first work station does not have to be present in this second exemplary embodiment.

If in the case of this exemplary embodiment a first work station for the application of at least one adhesion site of glue or a casting compound is still provided, the at least one adhesion site does not necessarily have to be applied by a handling device. On account of the receptacle in the material web which is always held ready at the same position at the work station, it may be sufficient to provide at least one dispenser device at this position at the first work station, preferably a stationary dispenser device.

The third work station or—if the first work station is not present—the last work station also does not necessarily need to be equipped with a handling device for casting the data carrier applied in the previous work station because the material web is also halted at this last work station such that the respective receptacle with the already applied data carrier is always located exactly at the same position. There is then no need to provide any handling device at this last work station. It can suffice to provide merely at least one dispenser device for the casting compound, preferably a stationary one.

LIST OF DESIGNATIONS 10 first work station
11 second work station
12 third work station
13 conveyor
14 data carrier
15 plate body
16 opening
17 edge
18 contour
19 gap
20 film
21 adhesion site
22 direction of transport
23 upper strand
24 handling device
25 dispenser device
26 imaging device
27 handling device
28 gripper arm
29 suction device
30 pre-supply conveyor
31 stocking device
32 upper strand
33 imaging device
34 read station
35 imaging device
36 imaging device
37 front side
38 slit
39 rear side

The invention claimed is:

1. A method for providing a registration plate with a data carrier (14) which can be read contactlessly, wherein the data carrier (14) is positioned in a receptacle, provided for the data carrier (14), of a plate body (15) or of a material web for the formation of plate bodies of the registration plate, wherein the data carrier (14) is gripped by a handling device (27) in a targeted manner, the position of the data carrier (14) held by the handling device (27) is determined by a first measuring or imaging device (35) and the plate body (15) or the material web is then fitted with the data carrier (14) on the basis of the obtained position of the data carrier (14) on the handling device (27), and wherein before the handling device (27) fits the plate body (15) or the material web for the formation of plate bodies (15) with the data carrier (14), the position of the plate body (15) or of the material web and/or of the receptacle of the plate body (15) or of the material web is determined by at least a second measuring or imaging device (36).

2. The method as claimed in claim 1, wherein, supported by a further measuring or imaging device (33), the data carrier or simultaneously a plurality of data carriers (14) is/are gripped by the handling device (27) from a plurality of data carriers (14) lying on a level surface.

3. The method as claimed in claim 1, wherein after the data carrier (14) has been gripped by the handling device (27) the data carrier (14) is tested by a test of the readability of at least some data on the data carrier (14).

4. The method as claimed in claim 1, wherein after the data carrier (14) has been gripped by the handling device (27) at least individual data are read from the data carrier (14) and stored in a memory.

5. The method as claimed in claim 1, wherein the data carrier (14) is pre-fixed in the receptacle of the plate body (15) or of the material web when the at least one data carrier (14) is inserted by the handling device (27) into the receptacle of the plate body (15) or the material web for the formation of plate bodies by being placed on an adhesion site (21) on or in the receptacle.

6. The method as claimed in claim 5, wherein the data carrier (14) is inserted in such a manner by the handling device (27) into the receptacle, which is realised as an opening (16) in the plate body (15) or material web for the formation of the plate body, that a circumferential edge (17) of the data carrier (14) is spaced apart from contours of the opening (16) and/or a circumferential gap (19) is formed between one of the contours of the opening (16) and the edge (17) of the data carrier (14).

7. The method as claimed in claim 5, wherein the plate body (15) or the material web is provided, from its rear side (39), with the at least one adhesion site (21) and/or is fitted with the data carrier (14) and/or the data carrier (14) is cast or recast in the respective receptacle for the data carrier (14).

* * * * *

UNITED STATES PATENT AND TRADEMARK OFFICE
CERTIFICATE OF CORRECTION

PATENT NO. : 11,842,239 B2  
APPLICATION NO. : 16/651376  
DATED : December 12, 2023  
INVENTOR(S) : Piet Tönjes Page 1 of 1

It is certified that error appears in the above-identified patent and that said Letters Patent is hereby corrected as shown below:

On the Title Page (71) Applicants should read: Tönnjes ISI Patent Holding GmbH, Delmenhorst (DE)

(73) Assignees should read: Tönnjes ISI Patent Holding GmbH, Delmenhorst (DE)

Signed and Sealed this
Tenth Day of September, 2024

Katherine Kelly Vidal
*Director of the United States Patent and Trademark Office*